(12) United States Patent
Digman et al.

(10) Patent No.: US 6,280,654 B1
(45) Date of Patent: Aug. 28, 2001

(54) GLOW IN THE DARK ROSIN

(76) Inventors: Steven M. Digman, 826 4th Ave., North, Jacksonville Beach, FL (US) 32250; Thomas M. Walraven, 3839 Union Pacific Dr. W., Jacksonville, FL (US) 32246

( * ) Notice: Subject to any disclaimer, the term of this patent is extended or adjusted under 35 U.S.C. 154(b) by 0 days.

(21) Appl. No.: 09/481,538

(22) Filed: Jan. 12, 2000

Related U.S. Application Data
(60) Provisional application No. 60/115,999, filed on Jan. 15, 1999.

(51) Int. Cl.[7] .................................................. C09K 11/02
(52) U.S. Cl. .............................. 252/301.34; 252/301.36; 106/241
(58) Field of Search ........................ 252/301.36, 301.34; 106/36, 241

(56) References Cited

U.S. PATENT DOCUMENTS

| | | | |
|---|---|---|---|
| 1,384,706 | * | 7/1921 | Meyner . |
| 2,109,416 | * | 2/1938 | Dziemczyk ............................ 106/36 |
| 2,422,360 | * | 6/1947 | McBride ................................ 84/315 |
| 3,943,815 | * | 3/1976 | Gilbert .................................. 84/293 |
| 3,972,528 | * | 8/1976 | McCracken et al. ............... 273/72 A |
| 4,176,205 | * | 11/1979 | Molina .................................... 427/1 |
| 4,411,093 | * | 10/1983 | Stout et al. ............................ 43/114 |
| 4,629,583 | * | 12/1986 | Goguen .......................... 252/301.35 |
| 5,192,080 | * | 3/1993 | Duncan ................................. 273/412 |
| 5,357,636 | * | 10/1994 | Dresdner, Jr. et al. ............... 2/161.7 |
| 5,424,006 | * | 6/1995 | Murayama et al. .......... 252/301.4 R |
| 5,565,023 | * | 10/1996 | Sereboff ................................ 106/35 |
| 5,649,869 | | 7/1997 | Infantino et al. .................... 473/118 |
| 5,796,025 | | 8/1998 | Haake ............................... 84/464 R |

FOREIGN PATENT DOCUMENTS

| | | | |
|---|---|---|---|
| 3413706 | * | 10/1985 | (DE) . |
| 251369 | * | 5/1926 | (GB) ...................................... 106/36 |
| 1468517 | * | 9/1974 | (GB) ...................................... 106/36 |
| 52-89137 | * | 7/1977 | (JP) . |
| WO 9322071 | * | 4/1993 | (WO) . |

\* cited by examiner

Primary Examiner—C. Melissa Koslow

(57) ABSTRACT

A luminescent compound comprising an admixture of rosin and a luminescent glow pigment and methods for its use are disclosed. The luminescent glow pigment conveys a "glow in the dark" quality to the compound providing a rosin that retains its physical properties and gains the ability to be seen in little or no light. The "glow in the dark" rosin may be used for both aesthetic and practical purposes where conventional rosins are employed, and in other ways where the properties of a rosin that may be seen in the dark are desirable.

15 Claims, No Drawings

GLOW IN THE DARK ROSIN

CROSS REFERENCE TO RELATED APPLICATION

This application claims priority of co-pending U.S. Provisional Application Ser. No. 60/115,999, filed Jan. 15, 1999. The disclosure from that application is incorporated herein in its entirety.

BACKGROUND OF THE INVENTION

1. Technical Field

This invention relates generally to rosin for use in connection with enhancing the coefficient of friction of an object or surface.

2. Discussion of Prior Technology

Lighting effects as well as many other types of visual effects are often employed to provide a pleasing experience for the audience during musical performances. One avenue for doing so is provided by enhancing the visual appearance of the musical instruments. This can prove to be ineffective in a large or dark venue wherein the audience may be unable to see the modifications made. Therefore, methods for providing additional aesthetically pleasing qualities by illuminating the artists or their instruments have been developed.

For example, U.S. Pat. No. 5,796,025, issued Aug. 18, 1998 to Haake, provides for the lighting of the surface of a stringed instrument with at least one light source embedded in the body of the instrument. The light source feeds a plurality of optical fibers that illuminate the surface of the instrument when electrically powered. Controls for the light source are provided on the instrument allowing the artist to vary the lighting effect produced.

The neck of a stringed instrument is shown illuminated in U.S. Pat. No. 3,943,815, issued Mar. 16, 1976 to Gilbert. A light source is embedded in the body of the instrument delivering light through fiber optic strands to fret markers located along the length of the neck.

The conventional methods for illuminating musical instruments are limited by their reliance on electrical energy and have been applied to instruments not requiring a bow.

SUMMARY OF THE INVENTION

The primary object of this invention is to replace conventional rosins with a "glow in the dark" rosin in either a cake or powdered form to produce a desired visual effect. It is a particular object of this invention to provide a non-electrically powered lighting effect while maintaining the properties of conventional rosins.

Another object of this invention is to provide a method for making a "glow in the dark" rosin.

It is a further object of this invention to provide a cake rosin with "glow in the dark" properties that may be applied to violin bows, cello bows, double bass bows and any other bows used on string instruments.

Still another object of this invention is to provide a powdered form of the "glow in the dark rosin" that may be applied to violin bows, cello bows, double bass bows and any other bows used on string instruments.

A further object of this invention is to provide a "glow in the dark" rosin that may be used by athletes for obtaining a firm grip on a ball, bat, or other object while producing aesthetically pleasing visual effects.

Yet another object of this invention is to provide a "glow in the dark" rosin that may be used on walking surfaces to increase traction while providing a source of light.

The rosin may be applied to bows in the same manner as conventional rosin when preparing to play a violin, cello, double bass or any other stringed instrument to enhance the effects of a performance. Children can use the glow in the dark rosin simply as a novelty item, selecting the color of their choice. The rosin may also be produced in a powdered form to replace the conventional rosins used by athletes and other persons such as drummers and rock climbers. In addition, nursing homes and other health-care facilities have been known to cover the floors with powdered rosins and like materials to increase traction. The "glow in the dark" rosin provides traction and an illuminated walkway when used in a like manner.

The lighting effect produced upon the instruments by previous inventions varies visually from that created by a "glow in the dark" rosin applied to a bow according to the present invention which requires only sunlight as an energy source and is functionally as useful as conventional rosins in both musical and non-musical applications. The "glow in the dark" rosin retains all of the physical properties of conventional rosins while providing an aesthetically pleasing quality.

The aforesaid objects are achieved individually and in combination, and it is not intended that the present invention be construed as requiring two or more of the objects to be combined unless expressly required by the claims attached hereto.

The above and still further objects, features and advantages of the present invention will become apparent upon consideration of the following detailed description of specific embodiments thereof.

DESCRIPTION OF THE PREFERRED EMBODIMENTS OF THE INVENTION

In the preferred embodiment of the invention, "glow in the dark rosin" is a luminescent rosin compound formed of an admixture of luminescent glow pigment and rosin. By combining rosin and luminescent pigment, the present invention provides luminescent colored rosins that retain the physical properties of the uncolored, non-luminescent rosin. "Glow In The Dark" rosin can be made in a variety of colors depending on the luminescent glow pigments and rosins selected in preparing the product. The specific pigments and rosin are mentioned herein as examples only; it will be appreciated that there are dozens of such products that can serve as constituents for the product of the present invention.

In the present invention, the rosin component of the luminescent rosin compound is comprised of at least one rosin which is a synthetic or natural resin insoluble in water having the properties of being hard and friable or becoming increasingly soft and sticky when warmed above room temperature. The rosin fully liquefies upon reaching the melting point usually between 100° and 150° C. and, upon further heating, combusts at or near the flash point temperature generally around 370° F. (187° C.). The natural form of the rosin is derived from pine trees, chiefly Pinus palustris and Pinus caribaea, and retains the acidic nature of all rosins which generally have acid numbers above 150. The acidic nature of the rosin results principally from its chief constituents, resin acids of the abietic and primaric types, having the general formula $C_{19}H_{29}COOH$ and having a phenanthrene nucleus. Examples of a suitable rosin to be utilized as the rosin component of the luminescent rosin compound includes "Kafko Light Rosin", manufactured by Kafko International LTD of Skokie, Ill. "Shermin's Violin Rosin", 1418 Eagle Glenn Street, Escondido, Calif. 92029 and "Super—Sensitive Rosin", 1805 Apex Road, Sarasota, Fla. 34240-9386.

The pigment component of the luminescent rosin compound is comprised of at least one pigment that is any substance with luminescent properties that imparts color to another substance or mixture. A pigment that emits light as a result of an excitation of the pigment's atoms, usually induced by some form of radiation such as sunlight, is defined as having luminescent properties. Examples of luminescent glow pigments include "Ultra Green", manufactured by Pete's Luminous Creations of Singapore; "Phosphorescent Pigment", manufactured by Firefly Cosmetics of Rutherford, N.J. "Lumilux effect green N-FG", manufactured by Allied Signal of Moristown, N.J. and "Globug Phosphor H13", manufactured by Capricorn Chemicals of England.

In a preferred method for fabricating "glow in the dark" rosin in cake form, the selected rosin is placed in any container conductive to heat. The rosin is then liquefied by slowly heating the container. Gradually, the chosen luminescent glow pigment is added to the liquefied rosin, stirred occasionally to assure uniform mixing. When preparing the "glow in the dark" compound for either the cake rosin or the powdered rosin, the mixture is created in a ratio of two parts by volume luminescent glow pigment to one part by volume rosin. The mixture is then allowed to cool to a solid state thereby forming the cake rosin. Shredding the cake rosin product produces the powdered form of the rosin.

The ability of the rosin to act as a conventional rosin and glow in the dark permits its use by symphonies for special effects, highlighting the music and the rhythm of each string instrumentalist, and effectively rendering a performance a "Light Show" with music. The invention also has use in popular music, i.e., for rock musicians, country musicians, Irish bands, and any stage performers who employ a bow instrument. Importantly, the rosin has use as a study aid by highlighting proper or improper bow stroke movement.

The cake form may be applied in the same manner as violin rosin is now applied, namely by rubbing the rosin along the length of the bow hair numerous times. The powdered form can be applied to the bow string more quickly than the cake rosin by using a small felt tip applicator which, once dipped into the powdered rosin, tends to hold the powered rosin in place until it comes into direct contact with the bow. The powder should be applied in a sweeping motion to promote an even application of the rosin along the bow. The use of a felt tip adapter eliminates nearly all powdered residue and waste which has long been a major drawback to using a powdered rosin. Applying "glow in the dark" rosin to bows provides an amount of friction equivalent to that produced by conventional rosins required to produce sound when the bow is drawn across the strings of an instrument. The "glow in the dark" rosin may be applied to bows made with either horsehair or synthetic hair which are clean or have retained rosin from previous use. The end result is the hair of the bow glows enhancing the appearance of a musical performance in a dark or dimly lit area.

Apart from bows of stringed musical instruments, additional uses of "glow in the dark rosin" are in athletic events. For example, in a gymnastic event where powdered rosin is conventionally used to enhance the frictional grip for a gymnast's hands, use of "glow in the dark rosin" for the same grip would provide special visual effects in a dimly lit arena. For special segments of a sporting event or exhibition, the performers could perform in the dark and thereby literally highlight the dexterity and artistic movement of their hands. In performances such as juggling acts, the use of "glow in the dark rosin" for better grip of juggled balls, done in the dark, dramatically display the form and movement of the juggler's hands.

The elderly and other persons highly susceptible to physical injury from a fall require special care to prevent the occurrence of accidents. Rosin and like materials increase the traction on a walking surface, such as linoleum tiles, as a preventative measure by which to guard against slipping. The present invention provides for greater traction on a walking surface as well as an illuminated pathway in a dark environment. The ability to see in a dark or dimly lit area lessens the likelihood of tripping, falling, or otherwise being harmed. The use of "glow in the dark" rosin to increase traction and provide a light source is therefore highly advantageous in aiding to prevent an injury.

In yet another embodiment, the luminescent quality is imparted to a rosin, optionally in the form of a solid, used to increase the friction of an object to which the rosin is to be applied. The rosin is imparted with the luminescent quality by intermixing a luminescent glow pigment with the rosin to form a luminescent rosin compound. The resultant luminescent compound is preferably in the form of either a solid cake member or a powder.

While we have described what is now thought to be a preferred embodiment of the invention, it is to be understood that the same is susceptible of other forms and expressions. Consequently, we do not limit the precise formula or procedure to that described hereinabove.

EXAMPLE

A "glow in the dark" rosin was prepared using 640 grams of a selected rosin, "Shermin's Violin Rosin, 1418 Eagle Glenn Street, Escondido, Calif. 92029. In a container conducive to heating, the container was warmed to the rosin's melting point thereby liquefying the rosin. Further constituents of the "glow in the dark" rosin were then added in no particular order. An amount of 160 grams of the chosen luminescent glow pigment, "Globug Phosphor H13" (Capricorn Chemicals; Cambs, England), was added to the liquefied rosin, stirring occasionally to assure uniform mixing. In a similar manner, 15 grams of Bees Wax and 4 grams of Lamb Fat were intermixed with the rosin to form a final admixture. The admixture was then allowed to cool to a solid state thereby forming the luminescent rosin compound defined as a "glow in the dark" rosin.

What is claimed is:

1. The method of imparting a luminescent quality to a movable object by means of a friction-imparting rosin to provide dynamic visual effects upon movement of said movable object in a dark environment, said method comprising the steps of:

(a) intermixing a luminescent glow pigment with said rosin to form a luminescent rosin compound; and (b) applying the intermixed luminescent glow pigment and rosin to said movable object.

2. The method of claim 1 wherein said movable object is bow hair utilized with a musical string instrument.

3. The method of claim 1 wherein said movable object is at least one hand of a human being.

4. The method of claim 1 wherein said movable object is an object adapted to be tossed during a performance or athletic event.

5. The method of claim 1 wherein said luminescent rosin compound is in the form of a powder.

6. The method of claim 1 wherein said luminescent rosin compound is in the form of a solid cake member.

7. The method of claim 1 wherein step (a) further includes the step of liquefying the rosin prior to the step of intermixing to facilitate the step of intermixing the rosin with the luminescent glow pigment.

8. The method of claim 7 wherein step (a) further includes:
   (a.1). cooling the compound to provide a cake form of the compound.

9. The method of claim 8 wherein step (a) further includes:
   (a.2). converting the cake form of the compound to a powder.

10. The method of imparting a luminescent quality to a movable object comprising the step of applying to said movable object an admixture of friction-imparting rosin and a luminescent glow pigment to thereby permit said movable object to glow in the dark to provide dynamic visual effects upon movement of said movable object.

11. The method of claim 10 wherein said movable object is a bow for use with a stringed instrument.

12. The method of claim 10 wherein said movable object is a human hand.

13. A luminescent compound comprising an admixture of friction-imparting rosin and a luminescent glow pigment, the admixture having the property of imparting a luminescent quality to a movable object to which the admixture is applied to provide dynamic visual effects upon movement of the object in a dark environment.

14. The luminescent compound of claim 13 wherein said admixture is a powder.

15. The luminescent compound of claim 13 wherein said admixture is a cake form.

* * * * *